United States Patent

[11] 3,578,373

[72] Inventor Joseph R. Metz
Ridgefield, Conn.
[21] Appl. No. 800,475
[22] Filed Feb. 19, 1969
[45] Patented May 11, 1971
[73] Assignee Norco, Inc.
Ridgefield, Conn.

[54] POWER OR MANUALLY RELEASED CARGO LATCH
13 Claims, 12 Drawing Figs.

[52] U.S. Cl. ................................................ 294/83, 89/1.5
[51] Int. Cl. ................................................ B64d 1/00, B66c 1/00
[50] Field of Search ................................................ 294/83, 83.1, 83.1 (B), 83.1 (ER), 84, 88, 87.26; 89/1.5 (G); 24/241 (SL), 241 (PS)

[56] References Cited
UNITED STATES PATENTS
2,577,790 12/1951 McCormick .................. 24/241(SL)
3,149,851 9/1964 Adams .......................... 294/88X Primary Examiner—Evon C. Blunk
Assistant Examiner—Douglas D. Watts
Attorney—H. Gibner Lehmann ABSTRACT: A cargo latch releasable either electrically or at remote or proximal points manually, comprising a slide bolt movable across the mouth of the latch body. Control of the bolt movement is effected by a series of sears and levers arranged in a unique, compact and advantageous manner to give positive action, great strength and at the same time easy release.

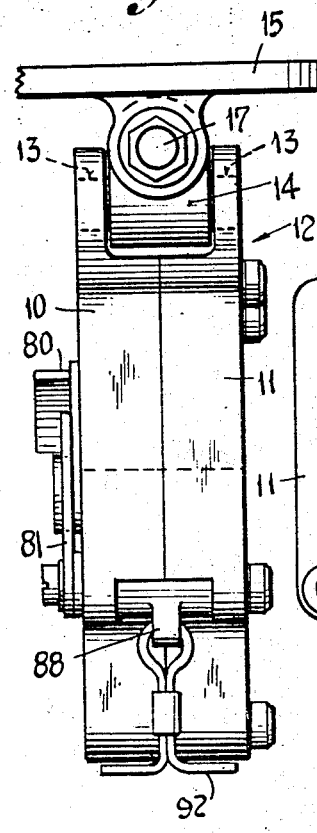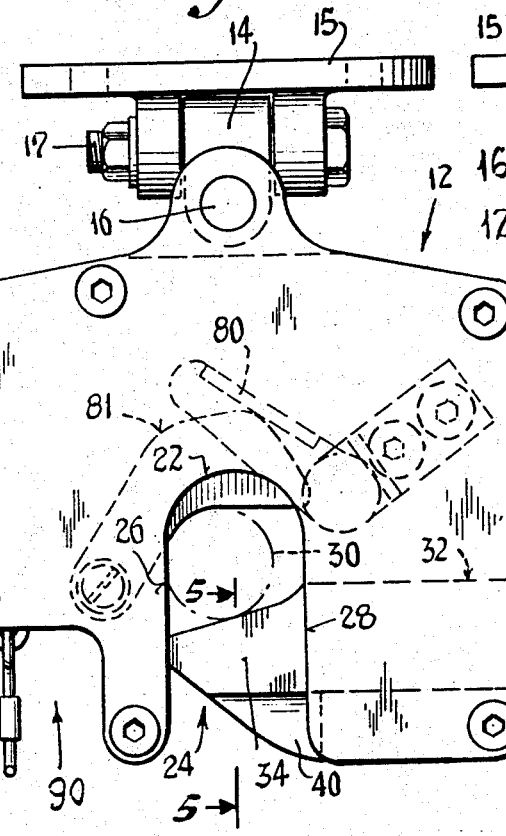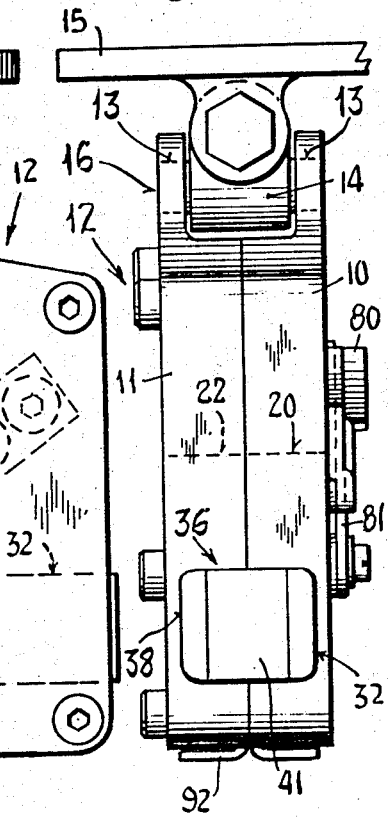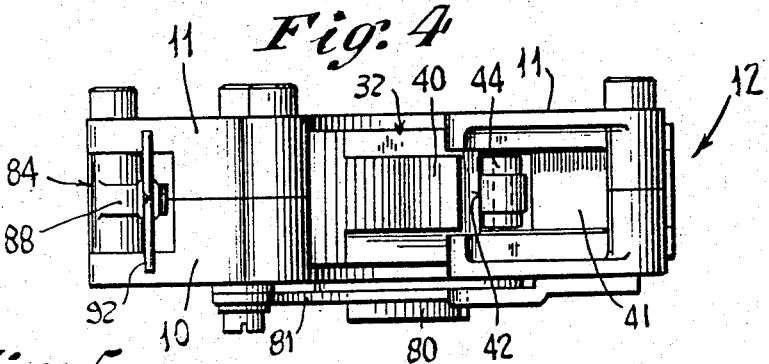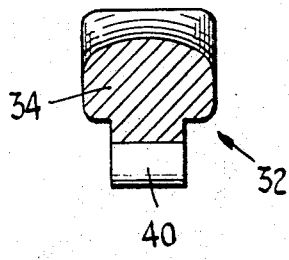

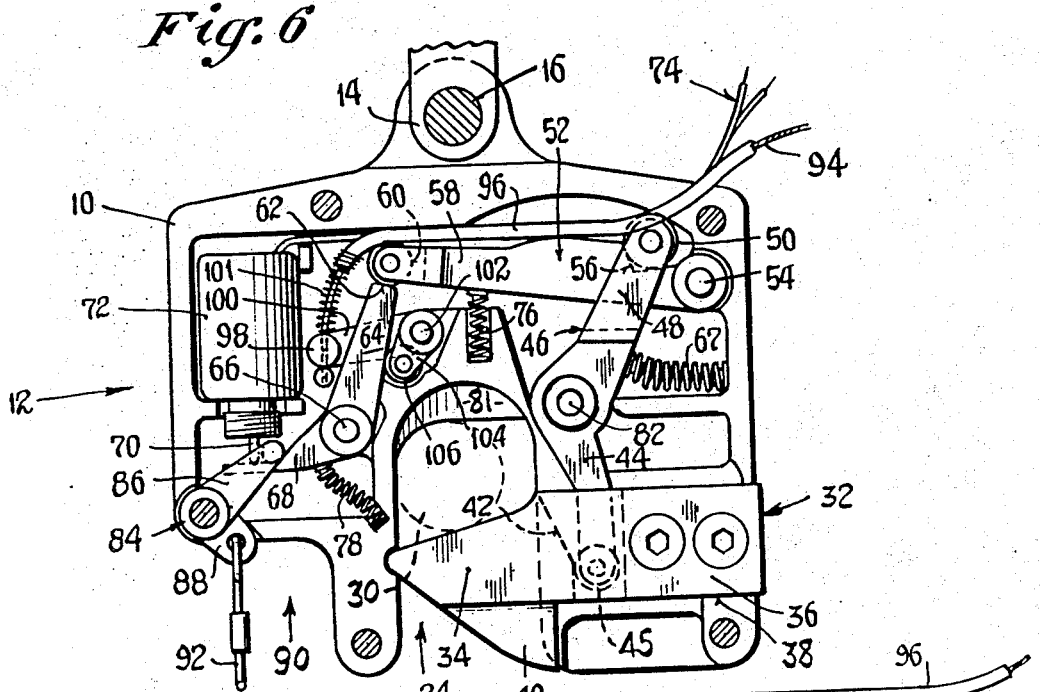
Fig. 6
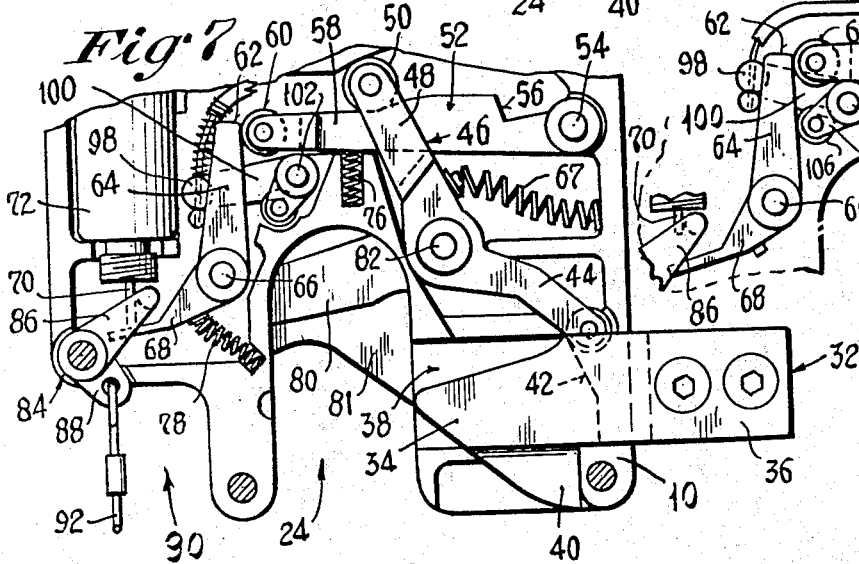
Fig. 7
Fig. 9
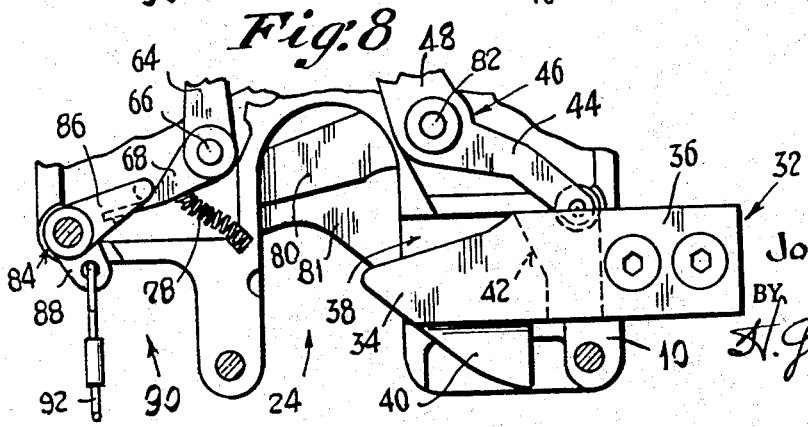
Fig. 8
INVENTOR.
Joseph R. Metz
BY
H. Gilmer Shumann
AGENT INVENTOR.
Joseph R. Metz
BY
AGENT

POWER OR MANUALLY RELEASED CARGO LATCH

BACKGROUND

This invention relates to power-operated cargo latches, also commonly referred to as cargo "hooks," of the kind adapted to latch onto fittings such as metal bars or rings attached to the cargo. Latches of this type are used with helicopters, to pick up, transport and discharge cargo or other loads.

Heretofore, cargo latches of the kind referred to generally comprised a notched latch body which pivotally mounted a load beam or jaw adapted to swing across the notch mouth. The load beam was actuated by a system which included a solenoid and toggles and levers, the latter being precisely dimensioned and assembled to effect the desired result. The use of toggles required that tolerances be closely held, since dimensional variations could readily result in malfunction. Moreover, any appreciable wear would have a similar undesired result, this being due to the very nature of toggles of the kind involved with powerful loads. In consequence the necessary care in manufacture made for an increased cost, and the need for adequate lubrication and cleanliness in minimizing wear of the various parts also constituted a disadvantage.

SUMMARY

The above drawbacks and disadvantages of prior cargo latches or "hooks" are obviated by the present invention, one object being the provision of an improved heavy duty power-operated cargo latch which is not especially critical in the tolerances and manufacture, and not likely to malfunction readily as a consequence of ordinary wear. Another object of the invention is to provide an improved latch as above set forth, which is easily actuated while at the same time being strong and powerful. These objects are accomplished by the provision of a slide bolt type cargo latch wherein a series of solenoid-powered sears and levers releases the bolt, the arrangement being such that an advantageous mechanical advantage is had while at the same time critical tolerances are eliminated.

Other features and advantages of the invention reside in an improved latch as above-characterized, which is simple and relatively economical in construction, small and compact, easily maintained and serviced, resistant to vibration and other adverse environments, and not likely to jam or fail even when severely used.

Still other features and advantages will hereinafter appear.

In the drawings:

FIG. 1 is a side elevational view of the improved solenoid-powered cargo latch as provided by the invention.

FIG. 2 is a front edge elevational view of the latch.

FIG. 3 is a back edge elevational view of the latch.

FIG. 4 is a bottom plan view of the latch.

FIG. 5 is a fragmentary section taken on the line 5—5 of FIG. 1.

FIG. 6 is a view like that of FIG. 1 but with a sideplate removed to reveal interior details. The slide bolt is shown in the latching position in both these FIGS.

FIG. 7 is a fragmentary view of the assemblage of FIG. 6 but showing the latch released under load by energization of a solenoid operator thereof.

FIG. 8 is a fragmentary view like that of FIG. 7 but showing a no-load release of the latch, by a proximal manual means or operator.

FIG. 9 is a fragmentary view similar to that of FIG. 8 but showing a remote manual release.

Figure 10:
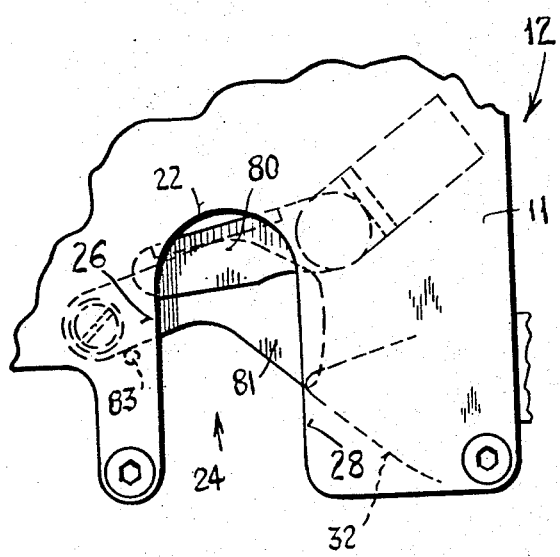
FIG. 10 is a fragmentary side elevational view of the latch showing the slide bolt in retracted or releasing position, and showing a latching bar and cam therefor in reset or cocking position.

Considering first FIGS. 1—4, the present improved solenoid-powered cargo latch as shown therein comprises two casing halves 10, 11 adapted to be secured together by screws to form a complete housing or latch body 12. At their upper portions, the casing halves 10, 11 have large aligned openings 13 receiving the pivot pin 16 of a universal-joint fitting 14 which is thereby pivotally secured to the latch body 12 and is secured to an anchorage plate 15 by a bolt 17.

The casing halves 10, 11 also have aligned deep bottom notches 20, 22 which together form the latch body throat or mouth 24, which latter is characterized by opposite parallel sides 26, 28. The mouth 24 is adapted to receive a bar or load ring 30 indicated in broken outline in FIGS. 1, 6 and 12, or a ring 31 indicated in FIG. 11. In these FIGS., the load bar or ring would be seen in transverse section.

In accordance with the present invention, there is slidably carried by the latch body 12 a multipiece slide bolt 32 and, related thereto, a series of solenoid-powered levers and sears by which an advantageous control over the release of the bolt 32 is had, all to the end that the load ring 30 (or ring 31) may be either held captive in the mouth 24 as seen in FIGS. 1, 6, 11 and 12, or else released therefrom as indicated in FIGS. 7—10.

The slide bolt 32 (see FIG. 5) is roughly of T-shaped section at its nose portion 34, said portion being tapered when viewed from the side as in FIGS. 1, 6 and 8. The bolt 32 has a generally rectangular body portion 36 which is accommodated substantially completely in a rectangular slide runway 38 formed by the two casing halves 10, 11. A depending portion 40 of the nose 34 is accommodated in a suitable clearance space between the casing halves, as seen in FIG. 7.

When extended across the mouth 24, the nose portion 34 of the slide bolt 32 holds captive the load ring 30 (or 31), whereas when the slide bolt is retracted (as seen in FIGS. 7 and 10) so as to withdraw the nose portion 34 from the mouth 24, the load ring is free for release from the mouth 24 of the latch body 12.

The slide bolt 32 is preferably made with a body insert portion 41, and has a tapered vertically extending recess 42, in which there is accommodated the lower arm 44 and roller 45 of a bolt lever 46 having an upper arm 48 provided at its extremity with a roller 50. Cooperable with the roller 50 is a first sear 52 comprising a lever having a pivot 54, and having a blocking face 56 disposed closely adjacent the pivot 54. The blocking face 56 is engageable with the roller 50 of the bolt lever 46, as seen in FIG. 6, thereby holding the slide bolt 32 in the locking position shown therein. The first sear 52 has a relatively long control arm 58 giving an appreciable mechanical advantage, said arm extending to a point remote from the pivot 54 and the extremity of the arm having a roller 60 which is engageable with a blocking face 62 of a second sear 64 carried on a pivot 66. As seen in FIG. 6, such engagement prevents the first sear 52 from swinging downward to release the bolt lever 46, whereby the slide bolt 32 is maintained in the latching position. However, if the second sear 64 should be swung slightly counterclockwise to the position shown in FIG. 7, the first sear 52 can then swing downward or counterclockwise, releasing the roller 50 on the arm 48 of the bolt lever 46 whereby such lever can swing counterclockwise to the position shown in FIG. 7. This movement of the bolt lever 46 is effected by the force of a compression spring 67, and also by the slide bolt 32 acting under the load of the load ring 30. Such ring exerts a camming action on the innermost (or uppermost as viewed in the FIGS.) sloping face of the slide bolt 32, thereby tending to cam the bolt to the right from the position of FIG. 6 to the position of FIG. 7.

The second sear 64 has an actuator arm 68 which is engageable with the plunger 70 of a solenoid 72 mounted in the clasp body, said solenoid being supplied with current through lead wires 74. When the solenoid 72 is energized, the plunger 70 thereof is forced downward. When the plunger engages the sear actuator arm 68 it swings the second sear counterclockwise to the FIG. 7 position, thereby effecting by means of the intermediate components a release of the slide bolt 32. The first and second sears 52, 64 are biased respectively in clockwise directions by compression springs 76, 78 as seen in FIG. 6. Accordingly, when the slide bolt 32 is shifted from right to left, considering FIGS. 6 and 7, this and the action of the spring 67 will return the bolt lever 46 to its locking position, enabling the first and second sears 52, 64 to return to their latching positions under the actions of their respective springs, all as shown in FIG. 6.

The latching or advancing movement of the slide bolt 32 is effected by means of a latching bar 80 carried by the pivotal shaft 82 of the bolt lever 46, and a latching cam 81 acting on the bar 80. For the releasing condition of the latch, the latching cam 81 (see FIGS. 7, 8 & 10) extends fully across the inner end of the mouth 24 resting against a stop pin 83. When the load ring 30 (or ring 31) is inserted fully in the mouth, it will shift the latching cam 81 upward and counterclockwise as viewed in FIGS. 7 and 10—12, to the position of FIGS. 1 and 12 or 11, thus effecting a clockwise movement of the latching bar 80 and a right-to-left latching movement of the slide bolt 32. The latching bar 80 is rigidly affixed to the pivot shaft 82 which also has rigidly affixed to it the bolt lever 46 whereby these three components all move as a unit, as will be understood.

It will be noted that the latch construction as above set forth is devoid of toggle systems but instead involves only levers and sears. Accordingly, critical tolerances are not required, in contradistinction to load-carrying toggles, nor is there a likelihood of malfunctioning as components wear in ordinary usage. It is well known that powerful toggle systems (which do not employ resilient parts) must be accurately dimensioned in order to function satisfactorily.

In accordance with the present invention, a novel, semiprotected release mechanism is provided to enable reliable proximal manual release of the latch to be effected. As seen in FIGS. 6 and 8, the latch body 12 pivotally carries a release lever or member 84 in the form of a bellcrank, having an arm 86 engageable with the actuator arm 68 of the second sear 64. The bellcrank 84 has a second arm 88 projecting into a recess 90 of the latch body, there being a release ring or handle 92 connected to the arm 88 to actuate the bellcrank or release lever 84. Pulling on the handle 92 will swing the bellcrank 84 clockwise, thereby swinging the second sear 64 counterclockwise so as to effectuate the release of the slide bolt 32. Since the pull handle 92 is disposed within the recess 90 of the latch body it is in a large measure protected from damage and displacement whereby it provides a reliable proximal manual release means.

A remote manual release is also provided, in accordance with the invention, comprising a remote release cable 94 passing through a tubular guide 96 carried in the latch body 12. The inner end of the cable 94 is connected to a fitting 98 on a bellcrank arm 100, said bellcrank being acted on by a spring 101 and being pivoted at 102. The bellcrank has a second arm 104 carrying a roller 106 which is engageable with the second sear 64 in such a manner that when the bellcrank 100 is pivoted clockwise, as by pulling on the release cable 94, the roller 106 will shift the second sear 64 counterclockwise so as to release the first sear 52. Return of the release cable 94 to the latching position shown in FIG. 6 will enable the sears to reset themselves when entry of the load ring 30 occurs and shifts the slide bolt 32 from right to left. The releasing action as effected by the remote control cable 94 is illustrated in FIG. 9.

An important feature of the invention resides in the provision of the slide bolt construction whereby the back end or rectangular body portion of the bolt projects from the latch body while the bolt is in the releasing position, all as seen in FIG. 7. If for some reason difficulty is had in overcoming the force of the spring 67 by the load ring and latching bar 80 so as to effect the latching movement of the slide bolt 32, such bolt may be positively shifted to the latching position by applying suitable force to the body portion 36 which projects as shown in FIG. 7.

Figure 11:
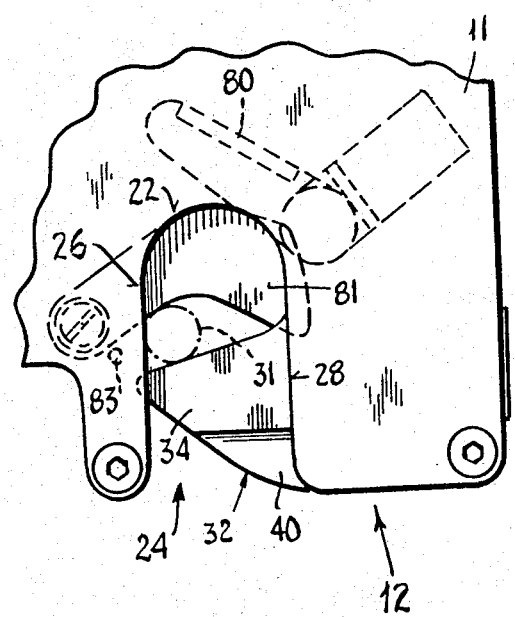
FIG. 11 is a view like FIG. 10 but showing a latched position, with the latch holding a load ring of three-eighth inch diameter cross section.
Figure 12:
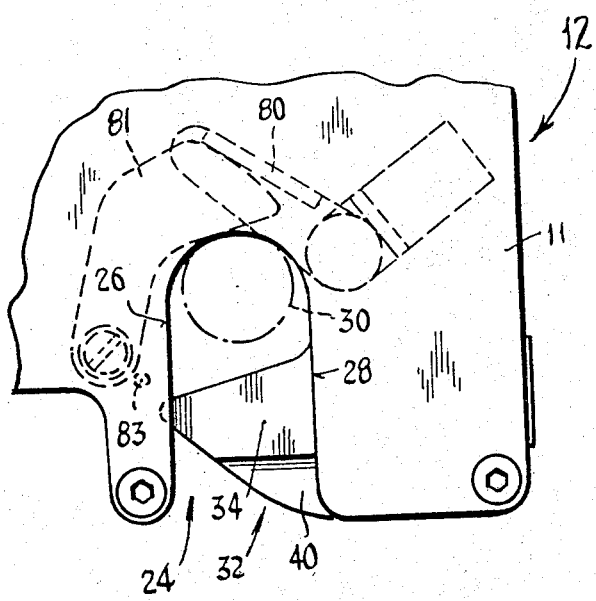
FIG. 12 is a view like FIGS. 10 and 11 but showing a latched position with the latch holding a load ring of three-fourth inch diameter cross section.

FIG. 10 shows the bolt 32 retracted, it being normally held in this position under the action of the spring 67 for the bolt lever 46. The latching bar 80 and latching cam 81 are extended in readiness for engagement by the load ring (30 or 31) attached to the cargo. FIG. 11 depicts the insertion of the small-section ring 31, which has lifted the latching cam 81 and bar 80. Completion of the latching movement of the bar 80 and slide bolt 32 may be effected by external force applied to the protruding back end 36 of the bolt, whereupon the sears 52 and 64 take over the maintenance of the latching. FIG. 12 shows the insertion of the large-section load ring 30, which has fully lifted the latching cam 81 and latching bar 80, and has fully shifted the slide bolt 32 to its latching position, secured by the sears 52, 64.

It will now be understood from the foregoing that I have provided a novel and improved cargo latch involving a power-released slide bolt which is controlled by a series of levers and sears, as distinguished from toggle links and the like. With the present improved construction, highly critical tolerances need not be maintained, and slight changes in dimensions due to ordinary wear will not result in malfunctioning of the latch. Relatively few parts are involved, these being of simple construction, and the entire latch may be readily fabricated and quickly economically assembled.

Variations and modifications are possible, and portions of the improvement may be used without others.

I claim:

1. A cargo latch comprising, in combination:
    a. a latch body having a mouth to receive a fitting of a cargo load,
    b. a slide bolt slidably carried by the latch body and movable across the entrance of said mouth to block and hold the cargo fitting captive or to release the same,
    c. control means including a first sear, for restraining the bolt in said blocking position across the body mouth,
    d. said first sear comprising a lever having a blocking face closely adjacent the pivot thereof,
    e. said first sear having a control arm extending to a point remote from said pivot,
    f. a positive blocking means for the first sear, said means comprising a second sear constituted as a lever having one arm engageable with the extremity of the said control arm to positively block the same and disengageable from said extremity to free the same, and
    g. means independent of said first sear for swinging the second sear to effect release of the first sear and said slide bolt.
2. The invention as defined in claim 1, wherein:
    a. said control means comprises a first class lever having its ends respectively engageable with the slide bolt and first sear,
    b. said first sear and slide bolt being disposed in spaced, substantially parallel relation with the first class lever extending therebetween.
3. The invention as defined in claim 2, wherein:
    a. said means for actuating the second sear comprises a bellcrank mounted on the latch body and a pull handle attached to the bellcrank.
4. The invention as defined in claim 1, wherein:
    a. said means for actuating the second sear comprises a solenoid carried by the latch body, and an arm connected with the second sear and engageable with the plunger of the solenoid.
5. The invention as defined in claim 1, wherein:
    a. said means for actuating the second sear comprises a release lever engageable therewith and a remote control cable connected with the release lever and leading from the latch body.
6. The invention as defined in claim 1 and further including:

a. spring means biasing said first and second sears to their blocking positions.

7. The invention as defined in claim 1 and further including:
a. a latching bar pivotally carried by the latch body and extendable across the mouth thereof to be engaged and displaced by the cargo load fitting as the latter enters said mouth, and
b. means for effecting extension of the slide bolt across the mouth in response to displacement of the latching bar therefrom.

8. The invention as defined in claim 7, wherein:
a. said control means comprises a first class lever having its ends respectively engageable with the slide bolt and first sear,
b. said latching bar being connected with said first class lever to actuate the same.

9. The invention as defined in claim 1, wherein:
a. the slide bolt has a tapered front nose end adapted to be received in the mouth of the latch body, the back end of the bolt protruding from the body when the bolt is in the releasing position and being accessible for the application of force to shift the bolt across the said mouth.

10. A cargo latch comprising, in combination:
a. a latch body having a mouth to receive a fitting of a cargo load,
b. load-holding means including a load member movably carried by the latch body and movable either into said mouth to a blocking position to block and hold the cargo fitting captive or else out of said mouth to a releasing position to release the fitting,
c. control means including a first sear, for restraining the load member in said blocking position in the body mouth,
d. said first sear comprising a lever having a blocking face engageable with said load-holding means and constituting part of said control means, said face being located closely adjacent the pivot of the first sear,
e. said first sear being movable between positions blocking and releasing said load-holding means and having a control arm extending to a point remote from said pivot,
f. a positive blocking means for the first sear, said means comprising a second sear constituted as a lever having one arm engageable with the extremity of the said control arm when the second sear is in a blocking position, thereby to positively block the control arm, said second sear being swingable to an unblocking position wherein it is disengageable from said extremity longitudinally thereof to free said control arm,
g. means independent of said first sear for swinging the second sear to the unblocking position to effect release of the first sear and load-holding means.

11. The invention as defined in claim 11, wherein:
a. the means for actuating the second sear comprises a solenoid carried by the latch body, and an arm connected with the second sear and engageable with the plunger of the solenoid.

12. The invention as defined in claim 10, wherein:
a. the means for actuating the second sear comprises a release lever engageable therewith and a remote control cable connected with the release lever and leading from the latch body.

13. The invention as defined in claim 10, and further including:
a. a latching bar pivotally carried by the latch body and extendable across the mouth thereof to be engaged and displaced by the cargo load fitting as the latter enters said mouth, and
b. means for effecting extension of the load member across the mouth in response to displacement of the latching bar therefrom.